Aug. 14, 1945.  E. L. TURNBAUGH  2,382,754
DATE FINDER UNIT
Filed Dec. 20, 1940    4 Sheets-Sheet 1

Inventor
E. L. Turnbaugh
By Lacey & Lacey, Attorneys

Aug. 14, 1945.  E. L. TURNBAUGH  2,382,754
DATE FINDER UNIT
Filed Dec. 20, 1940   4 Sheets-Sheet 2

Inventor
E. L. Turnbaugh
By Lacey & Lacey, Attorneys

Aug. 14, 1945.  E. L. TURNBAUGH  2,382,754
DATE FINDER UNIT
Filed Dec. 20, 1940   4 Sheets-Sheet 3
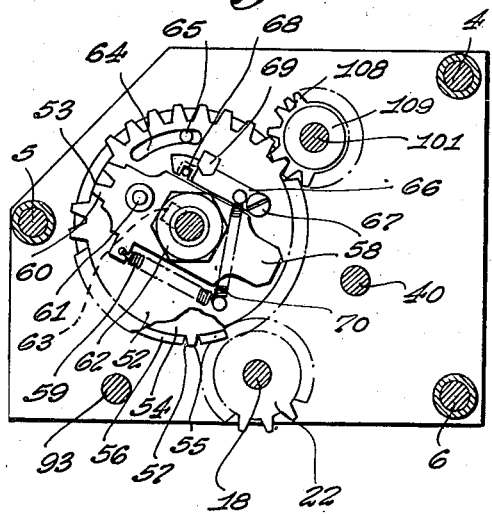
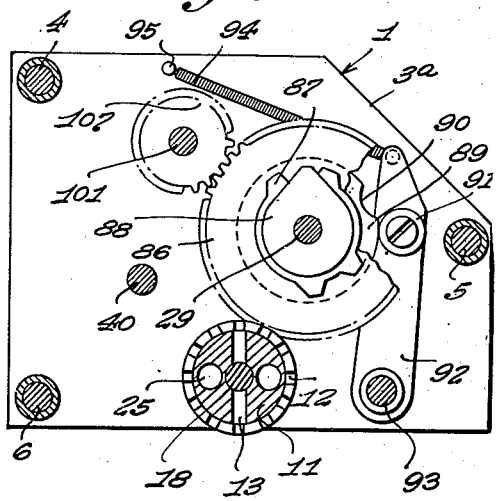
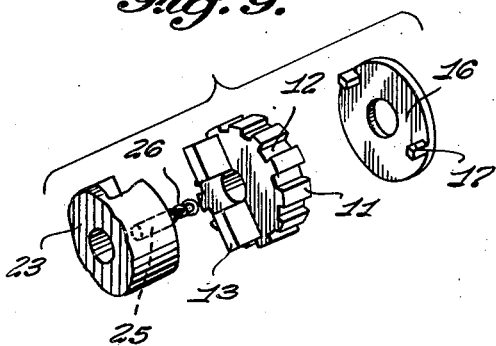
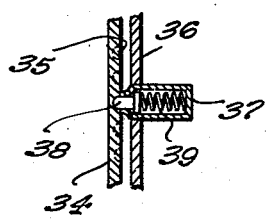
Inventor
E. L. Turnbaugh
By Lacey & Lacey, Attorneys

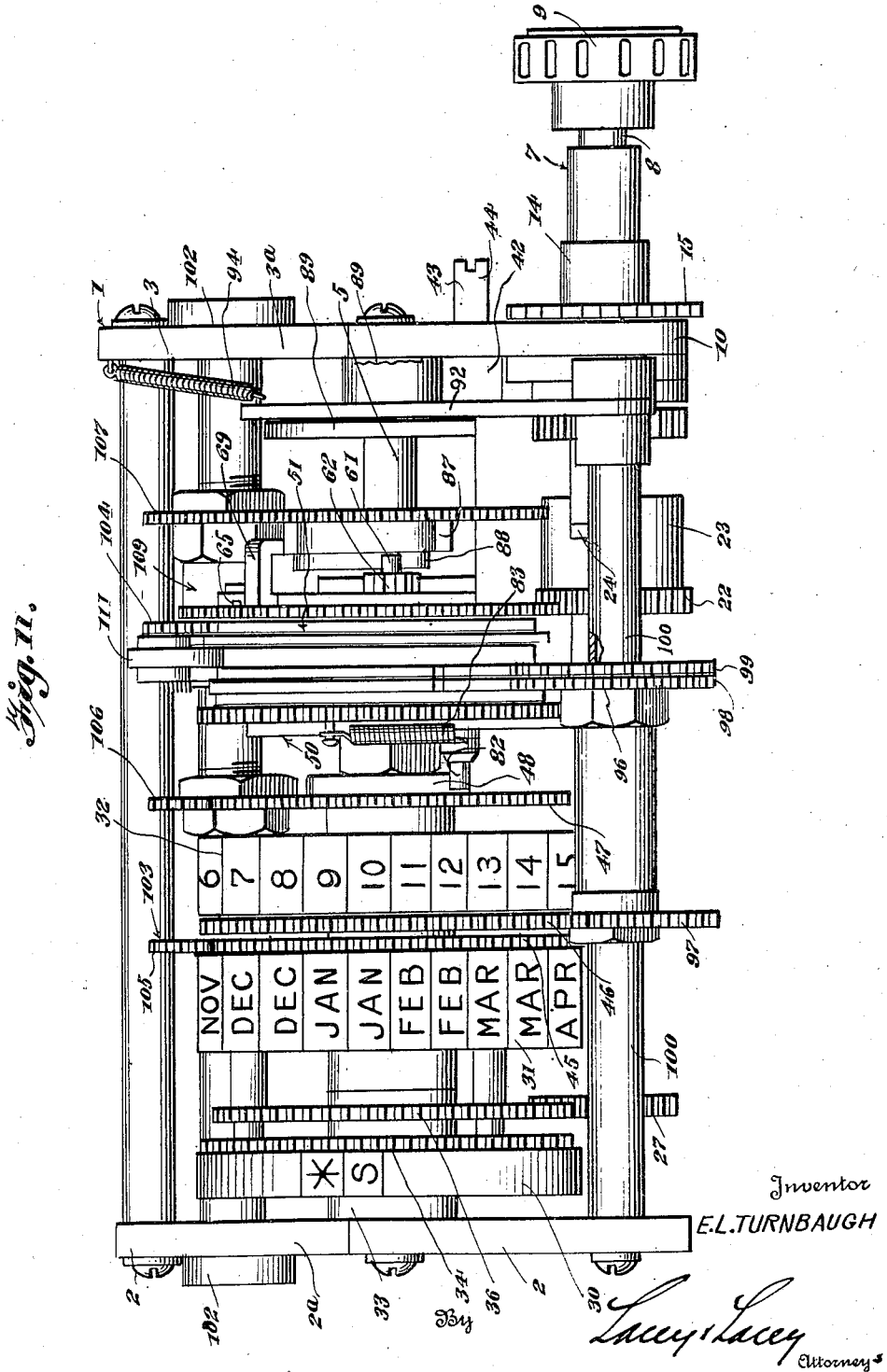

Patented Aug. 14, 1945

2,382,754

UNITED STATES PATENT OFFICE 2,382,754

DATE FINDER UNIT

Elbert L. Turnbaugh, San Francisco, Calif., assignor to Percentograph Inc., Carmel, Calif., a corporation of California Application December 20, 1940, Serial No. 371,059

6 Claims. (Cl. 40—111)

This invention relates to an improved date finder unit more particularly adapted for use with calculating machines of the type disclosed in my copending application, Serial No. 364,724, filed November 7, 1940.

The invention seeks, among other objects, to provide a date finder unit which will afford novel means for setting the terminating date of any commercial paper.

Another object of the invention is to provide a date finder unit which may be operated either in a forward or in a backward direction for calculating commercial interest between intervening dates or for calculating discount figures.

A further object of the invention is to provide a device of this character wherein means is employed for permitting resetting of the machine, when necessary, to make allowance for leap years.

And still another object of the invention is to provide a date finder unit which will be of relatively simple construction and will be easy to operate.

Other objects of the invention, not pointed out hereinbefore, will become apparent during the course of the following description.

In the drawings forming a part of my application:

Figure 1:
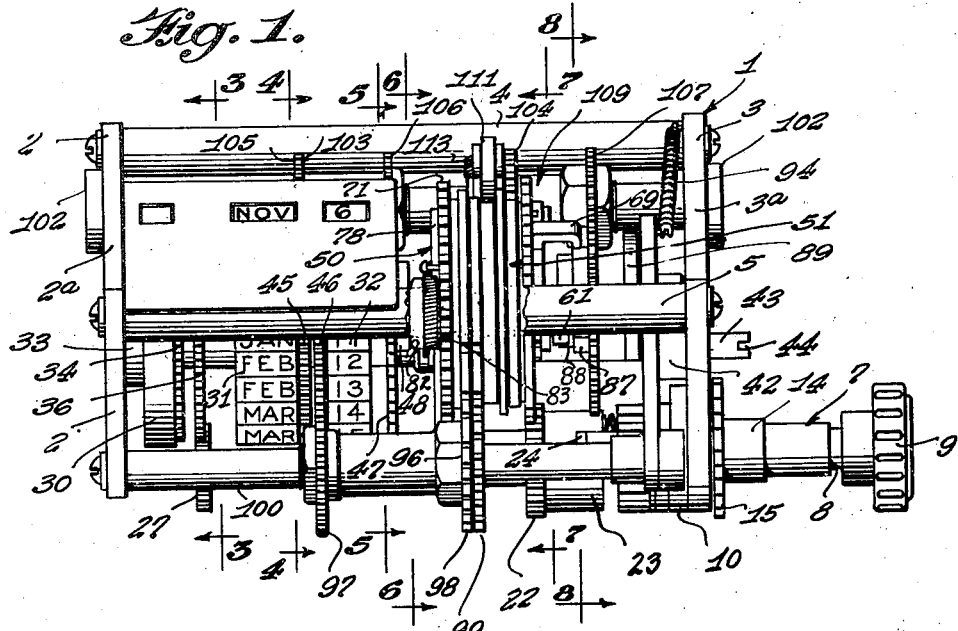
Figure 1 is a front elevation of my improved date finder unit.
Figure 2:
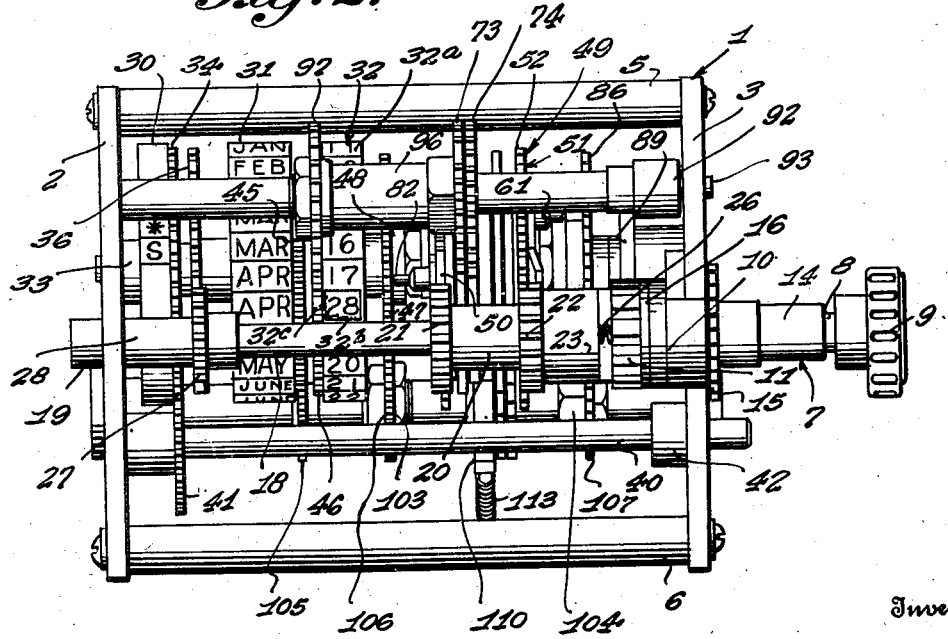
Figure 2 is a bottom view thereof.
Figure 3:
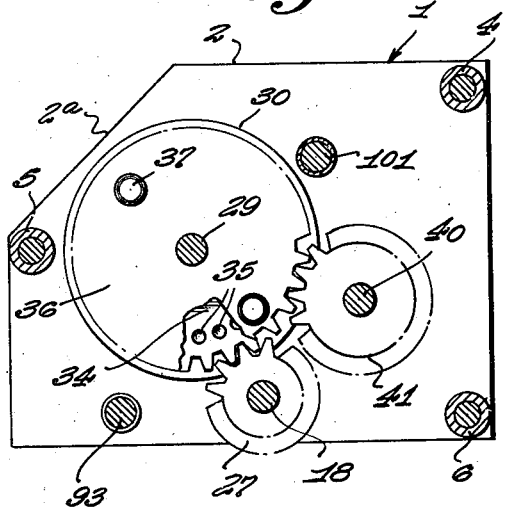
Figure 4:
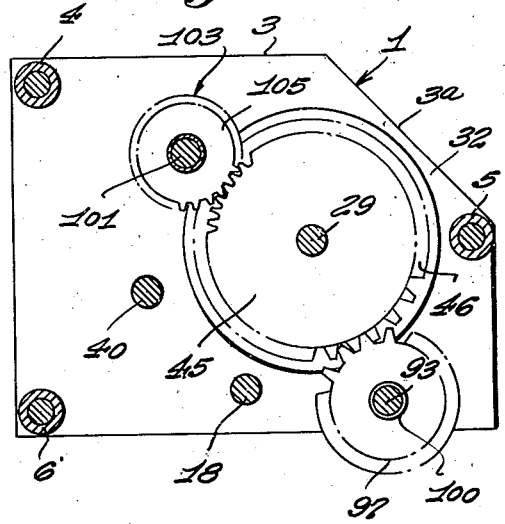
Figure 5:
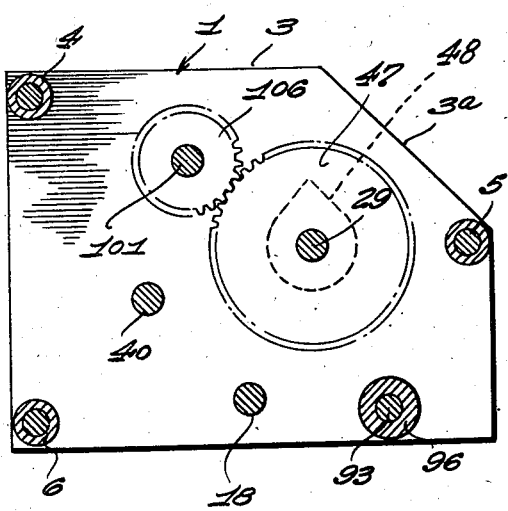
Figure 6:
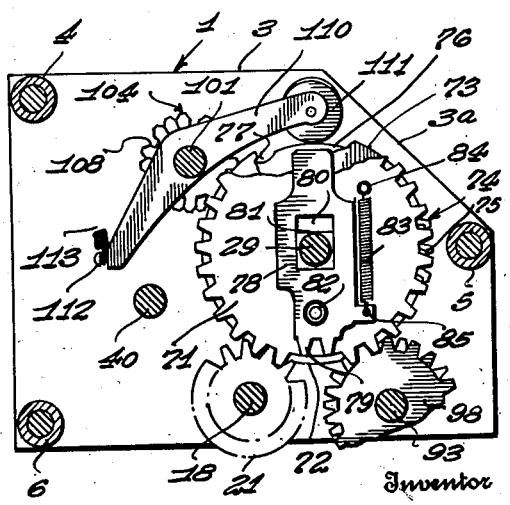

Figure 3 is a vertical sectional view on the line 3—3 of Figure 1, looking in the direction indicated by the arrows, Figure 4 is a vertical sectional view on the line 4—4 of Figure 1, Figure 5 is a vertical sectional view on the line 5—5 of Figure 1, Figure 6 is a vertical sectional view on the line 6—6 of Figure 1, Figure 7 is a vertical sectional view on the line 7—7 of Figure 1, Figure 8 is a vertical sectional view on the line 8—8 of Figure 1, Figure 9 is a detail perspective view showing a portion of the clutch mechanism employed, Figure 10 is a detail sectional view better showing the detent mechanism, and Figure 11 is a front elevation, on an enlarged scale, showing the arrangement of the gearing and indicator drums.

Referring now more particularly to the accompanying drawings wherein, as will be seen, like numerals of reference designate like parts throughout the various views, the numeral 1 indicates in general the frame of my improved date finder unit. The frame 1 includes end plates 2 and 3 which are normally retained in parallel spaced relation by means of spacer members 4, 5 and 6. As seen in Figures 3 through 8 of the drawings, the end plates 2 and 3 are formed with inclined edges 2ª and 3ª.

Mounted on the frame 1 is an operating shaft assembly 7. The operating shaft assembly includes a stub shaft 8 having a turning knob 9 at the outer end thereof. The stub shaft is mounted in a bearing 10 which is formed of bronze or other suitable material and is suitably secured to the end plate 3 substantially medially of its width. Formed on the inner end of the stub shaft 8 is a clutch member 11. The clutch member is best seen in Figure 9 of the drawings and by referring thereto, it will be seen that said clutch member is circular and is formed with recesses 12 and guide tongues 13.

Surrounding the stub shaft 8, within the bearing 10, is a clutch sleeve 14, and mounted on the sleeve is a gear 15. The clutch sleeve 14 also carries a clutch element 16 best seen in Figure 9, and said clutch element carries clutch teeth 17 which are selectively engageable in the recesses 12.

The operating shaft assembly 7 includes an operating shaft 18 which has one end portion journaled in the end plate 2 and the other end portion journaled by the stub shaft 8, which is counterbored for the purpose, in a conventional manner. A locking sleeve 19 is fixed to the projecting end of the shaft 18 in abutting engagement to the outer face of the plate 2 for the purpose of preventing displacement of the shaft within the frame. Pinned or otherwise suitably secured to the operating shaft 18, within the frame, is a driving pinion 20, said driving pinion having spaced pinion elements 21 and 22 and a connecting element 23, said connecting element having slots 24 which slidably receive the guide tongues 13.

The connecting element 23 is counterbored, as shown in dotted lines at 25 in Figure 9 to receive compression springs, one of which is shown at 26, said compression springs normally bearing against the face of the clutch member 11. The springs 26 will normally urge the clutch member 11 into engagement with the clutch element 16, with the result that the tongues 17 will be engaged in the recesses 12 and the clutch sleeve 14 thus operatively connected with the stub shaft 8. Rotation of the stub shaft will, accordingly, cause rotation of the sleeve 14 and the gear 15, said gear being employed for operatively connecting the date finder unit with the calculating machine with which it is associated. When the stub shaft is pushed inwardly within the clutch sleeve 14, the clutch member 11 will be disengaged from the clutch element 16. In this condition the operating shaft 18 and the stub shaft 8 may be rotated without rotating either the sleeve 14 or the gear 15. It will be understood that, inasmuch as the guide tongues 13 are slidably engageable in the slots 24, it will be possible to shift the stub shaft with respect to the operating shaft, against the tension of the springs 26. Also, inasmuch as the tongues 13 are always in engagement with the slots 24, the stub shaft 8 will always be operatively connected with the operating shaft 18. As soon as pressure is released from the stub shaft 8, the springs 26 will urge the clutch member 11 into engagement with the clutch element 16 so that the clutch sleeve 14 and gear 15 will be rotatably connected with said stub shaft.

It should be understood that the various gears and pinions forming a part of this invention are held in fixed relation on their respective shafts by means of tapered pins which extend through the gears and shafts. It should be understood, however, that any suitable means of securing the gears to their respective shafts may be employed.

Fixed on the operating shaft 18 near the end plate 2 is a single driving pinion 27, said single driving pinion being spaced from the end plate 2 by a sleeve 28. The purpose for the single driving pinion 27 will be brought out in more detail hereinafter.

Mounted in the frame near the center thereof and medially of its height is an indicator supporting shaft 29, said shaft extending throughout the length of the frame and having its end portions journaled in the plates 2 and 3. Mounted on the shaft 29 are indicator drums 30, 31 and 32, said indicator drums being of the same diameter but having circumferential faces, or edges, of different widths. The indicator drum 30 has only the letter "S" and an asterisk thereon. The purpose of the drum 30 is to permit setting of the drums 31 and 32 to allow for certain conditions as, for example, leap years. That is to say, it is necessary to reset the drum section 30 on leapyears after the 29th day of February and the first Sunday following to take care of the subsequent Sundays. The procedure for setting the drum section will be described in more detail hereinafter. The drum 30 is movable about the shaft 29 but is held against longitudinal movement on said shaft by means of a sleeve 33. A gear 34 is mounted against one face of the drum 30 and is of slightly less diameter than said drum. As best seen in Figure 3 of the drawings, the gear 34 is formed with an annular series of spaced recesses 35. In order normally to impart rotative movement to the indicator drum 30, I provide a driving gear 36, said driving gear being loosely mounted on the shaft 29 and being mounted in spaced relation to the gear 34 and being of substantially the same diameter as said gear 34. As best seen in Figures 3 and 10 of the drawings, the driving gear 36 carries a detent housing 37 thereon, said detent housing being located near the edge of the gear and being disposed to aline, selectively, with the recesses 35. The detent housing is, however, located on the face of the gear 36 opposite the face thereof which confronts the gear 34. The detent housing 37 carries a detent 38 which is normally urged outwardly by means of a compression spring 39, said detent being normally engageable in one of the recesses in the face of the gear 34 for retaining the drum 30 against relative movement with respect to the gear 36. The gear 36 meshes with the single driving pinion 27 so that, when the operating shaft assembly is rotated, the driving gear 36 will be rotated for rotating the gear 34 and the drum 30, by virtue of the detent connection between said gear 34 and said driving gear 36.

In order to rotate the drum 30 without rotating either the drums 31 or 32, I provide a vernier shaft 40, said vernier shaft having a gear 41 keyed thereto and extended throughout the length of the frame. The vernier shaft is journaled by the end plates 2 and 3 and is held against displacement by means of a collar 42. As will be seen at 43, the vernier shaft extends through the end plate 3 and is formed with a screw-driver slot 44. The gear 41 meshes with the gear 34 so that, when the shaft 40 is rotated, the gear 41 will transmit rotative movement to the drum 30, through the gear 34, without rotating either the shaft 29 or the drum 31 or drum 32.

The drum 31 is rotatable about the shaft 29 and carries against one face thereof a gear 45, said gear 45 being of somewhat less diameter than the diameter of said drum 31. Carried on the face of the indicator drum 31 are abbreviated words representing the months of the year, each month being placed on the surface of the drum twice, the occurrences of identical months being placed adjacent to each other. The structure employed for rotating the indicator drum 31 will be set forth in more detail hereinafter.

The drum 32 will now be described. This drum comprises an outer section $32^a$ which has on its circumferential surface the numbers 1 through 27. The outer section is formed with a cut-away portion $32^b$ which is substantially rectangular in configuration, said cut-away portion being for the purpose of revealing numerals on the space of a drum section $32^c$ which is of slightly less diameter than the section $32^a$ and which rotates within said section independently thereof. The numbers 28 through 31 are placed on the surface of the drum section $32^c$. The drum section $32^c$ is, as stated, rotatable independently of the drum section $32^a$, said drum section $32^a$ being pinned to rotate with the shaft 29, while the drum section $32^c$ is rotatable about said shaft 29. For imparting rotative movement to the drum section $32^c$, I provide a gear 46. It will thus be understood that, when the indicator supporting shaft 29 is rotated, the drum section $32^a$ will be rotated. Mechanism to be described hereinafter is required to cause rotation of the drum section $32^c$.

Mounted to rotate about the shaft 29, adjacent to the indicator drum 32, is a cam gear 47. Said cam gear has a cam 48 thereon. The purpose for the cam gear 48 will be set forth in more detail hereinafter.

Mounted on the shaft 29 is a double unit driving gear 49, said gear 49 including units 50 and 51, said units being better seen in Figures 6 and 7 of the drawings. The unit 51 is pinned to rotate with the shaft 29 and includes a driving gear 52 which is normally adapted to mesh with the pinion 22. As best seen in Figure 7, the gear 52 has a cut-away portion 53. Formed integrally with the gear 52 is a gear 54, said gear having but one tooth, indicated at 55, thereon. A gear flange 56 is also formed integrally with the gear 52 of the unit 51 and has a recess or socket 57 in alinement with the tooth 55 to cooperate therewith.

The gear 52 has slidably mounted on its face a gear segment 58, said segment being normally held in retracted position by means of a spring 59, said segment having teeth 60, of the same pitch as the teeth on the gear 52. An operating pin 61 is mounted on the face of the segment 58 and projects laterally therefrom. The segment 58 is held in sliding relation to the gear 52 by a nut 62, the extent of travel of the segment over the face of the gear 52 being limited by the limits of the slot 63, which is formed in the segment and receives the shaft 29 therethrough. The gear 52 has formed, near its outer circumferential edge, an arcuate slot 64 through which projects a connecting pin 65 which is carried on the gear unit 50.

A latch 66 is pivotally mounted on the face of the gear 52 by means of a screw 67. The latch has, near its free end, a notch to receive a pin 68 on the segment 58, said latch also carrying an operating arm 69 which projects laterally therefrom. A contractile spring 70 normally retains the latch in engagement with the pin 68, for retaining the segment with its teeth 60 free from the cut-away portion 53. The operation of the gear 52 with the segment 58 and the latch 66 thereon, will be set forth in more retail hereinafter.

The unit 50 is best seen in Figure 6, and by referring to this figure, it will be seen that said unit is rotatable about the shaft 29 and includes a gear 71 having a cut-away portion 72 thereon. The unit 50 also carries, adjacent to the gear 71, a gear flange 73, said gear flange having three spaced tooth receiving recesses, similar to the recess 72 in the gear 71. Adjacent the gear flange, there is formed integrally a gear 75 having but three teeth thereon. The remaining portion of the unit 50 is comprised by an annular surface 76 having a detent recess 77 therein.

The unit 50 carries a segment gear 78 which is similar to the segment gear 58. The segment gear 78 has a pair of teeth 79 thereon which project into the area adjacent the cut-away portion 72. The segment gear 78 is slidable over the face of the gear 71 diametrically thereof, this sliding movement being permitted by an elongated slot 80 which slidably receives a square bushing 81 about the shaft 29. A cam engaging pin or stud 82 is mounted on the face of the segment gear 78 and projects laterally therefrom. A contractile spring 83 is connected between a pin 84, on the gear 71, and a lug 85 which projects from said segment gear. Said spring normally retains the segment gear in retracted position on the face of the gear 71 and out of the area adjacent the cut-away portion 72. The pin 82 is adapted for engagement with the cam 48 on the gear 47.

Rotatably mounted on the shaft 29 between the double unit driving gear 49 and the end plate 3 is a double cam gear 86, said double cam gear having cams 87 and 88 mounted rigidly thereon. The cam 88 is for engagement by the pin 61 while the cam 87 is for engagement by the operating arm 69. As will be understood, the cam 87 is of irregular formation. In this connection, reference is particularly had to Figure 8 of the drawings.

Mounted on the shaft 29 between the double cam gear 86 and the plate 3 is a retaining disk 89, said disk having a recess 90 for engagement by a detent 91, said detent being carried on an arm 92 which is pivotally mounted on a countershaft 93, said counter-shaft extending between the end plates 2 and 3. In order to retain the detent 91 in engagement with the disk 89, I provide a contractile spring 94, said spring extending between the free end of the arm 92 and a pin 95 on the end plate 3.

In order to transmit rotative movement of the unit 50 of the double unit gear 49 to the gear 46 on the drum section 32ᶜ, I provide a double gear unit 96 which is pinned to the countershaft 93 and is located substantially medially between the ends of the frame. The double gear unit 96 includes a gear 97, which actually meshes with the gear 46, and gears 98 and 99 which mesh with the gears 73 and 74. The gear 98 is formed with cut-away portions which define groups of teeth with the result that, when the gear unit 50 is rotated through a complete rotation, the gears 98 and 99 will be rotated substantially one quarter rotation. The operation will be set forth in more detail hereinafter. Spacer sleeves 100 surround the counter-shaft 93 for effectively retaining the arm 92 in proper position.

Mounted in the frame is a transmission shaft 101, said transmission shaft being journaled by means of bearing bushings 102. The transmission shaft 101 has fixed thereon transmission units 103 and 104. The unit 103 includes gears 105 and 106 which are connected to each other by an integral sleeve. The gear 105 meshes with the gear 45 on the indicator drum 31 and the gear 106 meshes with the cam gear 47.

The transmission unit 104 is also mounted on the shaft 101 in such a manner that, when said shaft is rotated, the unit 104 will also be rotated. The transmission unit 104 includes a gear 107 which meshes with the double cam gear 86. The unit also includes a double gear 108 which double gear meshes with the gears 54 and 56 on the unit 51. The double gear 108 is connected to the gear 107 by means of a sleeve 109.

Rockably mounted on the shaft 101, between the units 103 and 104, is a detent lever 110, said detent lever having a detent roller 111 mounted at one end and having a pin 112 at the opposite end. The end of the detent lever, with the detent roller 111 therein is normally urged toward the surface 76 and the recess 77 by means of a contractile spring 113.

The operation of the invention will now be described.

It is first assumed that a calculating machine with which the invention may be associated is set with those numerals thereon, which are presented to confront the sight openings, indicating zeros. The calculating machine is of the type shown in my co-pending application, Serial No. 364,724 filed November 7, 1940. It is first necessary to find the desired terminating date for the commercial paper in question. To accomplish this, the knob 9 is pushed inwardly for disengaging the clutch member 11 from the clutch element 16. This is done in order to prevent rotation of the gear 15 when the knob is rotated. The knob is then rotated for rotating the indicator drums 31 and 32 for the desired terminating date which will be disclosed by said indicator drums 31 and 32. Then release knob 9 which will reengage with clutch element 16. The crank shaft of the calculating machine with which the date finder is associated is then rotated until the originating date is disclosed on drums 31 and 32.

the number of days intervening between the terminating and originating date being shown on a day counter unit of conventional design. Rotation of the indicator drums is, of course, accomplished by the driving pinion elements 21 and 22 which mesh with the gears of the double unit driving gear 49. More specifically, when the operating shaft 18 is operated, by action of the knob and stub shaft 8, the pinion elements 21 and 22 mesh with the gear units 50 and 51 for rotating the shaft 29. Rotation of the shaft 29 communicates rotative movement to the indicator drum 32, which drum indicates the days of the month up through 27. In order to indicate the remaining days of the month, i. e., 28, 29, 30 and 31, the drum section 32c is employed. This drum section is rotated by action of the gear unit 96 on the counter-shaft 93. That is to say, the gears 98 and 99 being in mesh with their associated gears on the section 50, will be rotated through substantially one-fourth a revolution at each complete revolution of said unit 50. This quarter revolution is transmitted through the gear 97 to the drum section 32c for presenting the proper numbers through the opening 32b in the drum section 32a. It will now be seen that the days of the month from 28 through 31 will be indicated through the opening 32b after each revolution of said indicator drum 32. At the same time, the unit 105 on the transmission shaft 101 will transmit rotative movement to the cam gear 47. The cam gear will be operated for shifting the pin 82 and thus shifting the segment gear 78 on the face of the gear 71. In other words, under certain conditions, it will be desirable to permit rotation of the section 51 through a small portion of its circumference without rotation of the unit 50, and vice versa. Slippage of the section 50 is caused when the segment gear is in retracted position on the face of said gear 71. However, when the cam gear 47 is rotated, the cam 48 will engage the pin 82 for urging the gear segment 78 into the area adjacent the cut-away portion 72. When this happens, the pinion element 21, which is sufficiently wide to engage both the gear 71 and the element 78, will rotate said gear 71 without slippage.

Rotation of the transmission shaft 101 will also cause rotation of the unit 104 with the result that said unit will transmit rotative movement to the double cam gear 86. Rotation of this gear causes the cam 88 to act upon the segment 58 in the same manner as does the cam 48 act upon the segment gear 78; that is to say, for allowing or preventing circumferential slippage of the driving gear 52 of the unit 51. The cam 87 cooperates with the arm 69 for alternately releasing and retaining the segment gear 58 on the face of the gear 52. As stated, it is desirable to allow relative movement between the sections 50 and 51 of the double unit driving gear 49 under certain conditions, such as, to allow for the months that have but thirty days.

After the terminate date has been found, by rotation of the gears and indicator drums in the manner hereinbefore set forth, the crank of the calculating machine with which the date finder unit is associated is rotated until the originating date appears. After this is done, the calculating machine will operate to show the base figure of interest for the length of time between the originating date and the terminating date.

The improved date finder unit can be operated backward as well as forward, the backward movement being used for calculating commercial interest between intervening dates, as hereinbefore explained, and the forward movement being employed for arriving at discount figures. Suitable mechanism on the calculating machine is employed for reversing the movement of the date finder unit.

The drum 30 has to be reset on leap years after the 29th day of February and the first Sunday following to allow for subsequent Sundays. This is accomplished by using a small instrument, such as a screw-driver, and rotating the shaft 40. The spring pressed detent 38 will permit rotation of the drum 30 without rotating the rest of the mechanism.

It is thought that the construction and operation of the improved date finder unit will now be understood.

Having thus described the invention, what is claimed as new is:

1. In a date finder unit, an indicator supporting shaft, a drum rotatably mounted on said shaft and having indicia relating to the months of the year thereon, another drum on said shaft and having inner and outer drum sections each having indicia relating to the days of the month, said inner drum section being rotatable about the shaft and said outer section being rotatable on the inner section and having a sight window for permitting viewing of indicia on the inner section, said outer section being rotated with the shaft, a countershaft, means on the countershaft and on the first mentioned shaft for imparting rotative movement to the outer drum section, a transmission shaft, and means on the transmission shaft and cooperating with said means on the first mentioned shaft for imparting movement to the first mentioned drum.

2. In a date finder unit, a plurality of drums, a shaft supporting the drums, one of said drums having the months of the year listed thereon and another of said drums having inner and outer sections, each of said sections having certain days of the month numbered thereon, an operating shaft, a countershaft, gears on said first mentioned shaft and said operating shaft for transmitting rotative movement in successive cycles to the outer section, gears on the countershaft cooperating with said gears on said first mentioned shaft for transmitting limited movement to said inner section at the termination of each said cycle, a transmission shaft, and means on the transmission shaft and cooperating with said first mentioned gears for transmitting a partial rotative movement to the first mentioned drum upon the completion of each rotation of the outer drum section.

3. The structure of claim 2, wherein said gears include a double unit driving gear, one of the units of said gear being fixed to the first mentioned shaft and the other of said units being rotatable thereabout, and means mounting the second mentioned unit for limited rotative movement with respect to the first mentioned unit.

4. In a date finder unit as recited in claim 2, including a drum having indicia thereon relating to the indicia on said other drums, means for imparting rotative movement to said last mentioned drum, said means including a gear on the operating shaft, a gear on the supporting shaft and meshing with the last mentioned gear, a gear on said last mentioned drum and a flexible connection between said gear on the supporting shaft and said last mentioned gear, and supplemental means for rotating said last mentioned drum independently of said last mentioned means, said supplemental means including a vernier shaft, and a gear on the vernier shaft and meshing with the gear on the last mentioned drum.

5. In a date finder unit as recited in claim 2, wherein the gears include a double unit driving gear, one of the units of said gear being fixed to the first mentioned shaft and the other of said units being rotatable thereabout, means mounting the second mentioned unit for limited movement with respect to the first mentioned unit, and means for releasing the first mentioned unit from the operating shaft to permit partial independent rotative movement of said inner section.

6. In a date finder unit, a drum having inner and outer sections each having indicia thereon, said outer section having an opening to permit viewing of the indicia on the inner section, an operating shaft, a shaft supporting the drum, a double unit driving gear having one unit fixed to the last mentioned shaft and the other rotatable thereabout, means on the operating shaft cooperating with the first mentioned unit of the driving gear for rotating the outer drum section, a countershaft, means on the countershaft cooperating with the second mentioned unit of the driving gear for imparting intermittent partial rotative movement to the inner drum section, means connecting the units of the driving gear to permit partial independent movement of said units, and means on the first mentioned driving gear unit for intermittently releasing said unit from the operating shaft whereby said inner drum section may be partially rotated with respect to the outer drum section, said last mentioned means comprising a gear segment, and a pin shiftable for retracting the segment from said first mentioned means.

ELBERT L. TURNBAUGH.